(12) United States Patent
Hough et al.

(10) Patent No.: US 6,418,264 B1
(45) Date of Patent: Jul. 9, 2002

(54) CONNECTING OPTICAL FIBRES

(75) Inventors: Stephen John Hough, Herefordshire; Laurence Llewellyn; Mark George Graveston, both of Gwent, all of (GB)

(73) Assignee: Pirelli General PLC, London (GB)

( * ) Notice: Subject to any disclaimer, the term of this patent is extended or adjusted under 35 U.S.C. 154(b) by 0 days.

(21) Appl. No.: 09/424,042

(22) PCT Filed: Apr. 29, 1998

(86) PCT No.: PCT/GB98/01247

§ 371 (c)(1),
(2), (4) Date: Apr. 7, 2000

(87) PCT Pub. No.: WO98/53354

PCT Pub. Date: Nov. 26, 1998

(30) Foreign Application Priority Data

May 19, 1997 (GB) .............................................. 9710097

(51) Int. Cl.[7] .................................................. G02B 6/00
(52) U.S. Cl. ......................................... 385/135; 385/147
(58) Field of Search ................................ 385/134–138, 385/53, 147

(56) References Cited

U.S. PATENT DOCUMENTS

| | | |
|---|---|---|
| 4,832,436 A | 5/1989 | Goto et al. |
| 5,187,766 A | 2/1993 | Finzel et al. |
| 5,323,478 A | 6/1994 | Milanowski et al. |
| 5,363,466 A | 11/1994 | Milanowski et al. |
| 5,740,299 A * | 4/1998 | Llewellyn et al. .......... 385/135 |
| 5,778,131 A * | 7/1998 | Llewellyn et al. .......... 385/135 |

FOREIGN PATENT DOCUMENTS

| | | |
|---|---|---|
| DE | 27 21 300 | 11/1978 |
| EP | 0 370 819 | 5/1990 |
| EP | 0 557 187 | 8/1993 |
| EP | 0 557 190 | 8/1993 |
| FR | 2 678 076 | 12/1992 |
| FR | 2 694 642 | 2/1994 |
| GB | 2 282 457 | 4/1995 |
| GB | 2 297 631 | 8/1996 |
| WO | 95/07477 | 3/1995 |

\* cited by examiner

*Primary Examiner*—Akm E. Ullah
(74) *Attorney, Agent, or Firm*—Finnegan, Henderson, Farabow, Garrett & Dunner, LLP

(57) ABSTRACT

An assembly 10 for use in connecting optical fibers comprising a plurality of housings 12 for housing optical fibre connections. Each housing is pivotally mounted with respect to an associated rigid routing member 14 which has passages for routing fibers to the housing via respective flexible conduit means which extend between the routing member and the housing. Adjacent routing members 14 are push-fittable together such that the housings 12 are in an aligned bank when in stowed positions. Each housing 12 is pivotable from its stowed position out of alignment with the other housings for access.

14 Claims, 7 Drawing Sheets

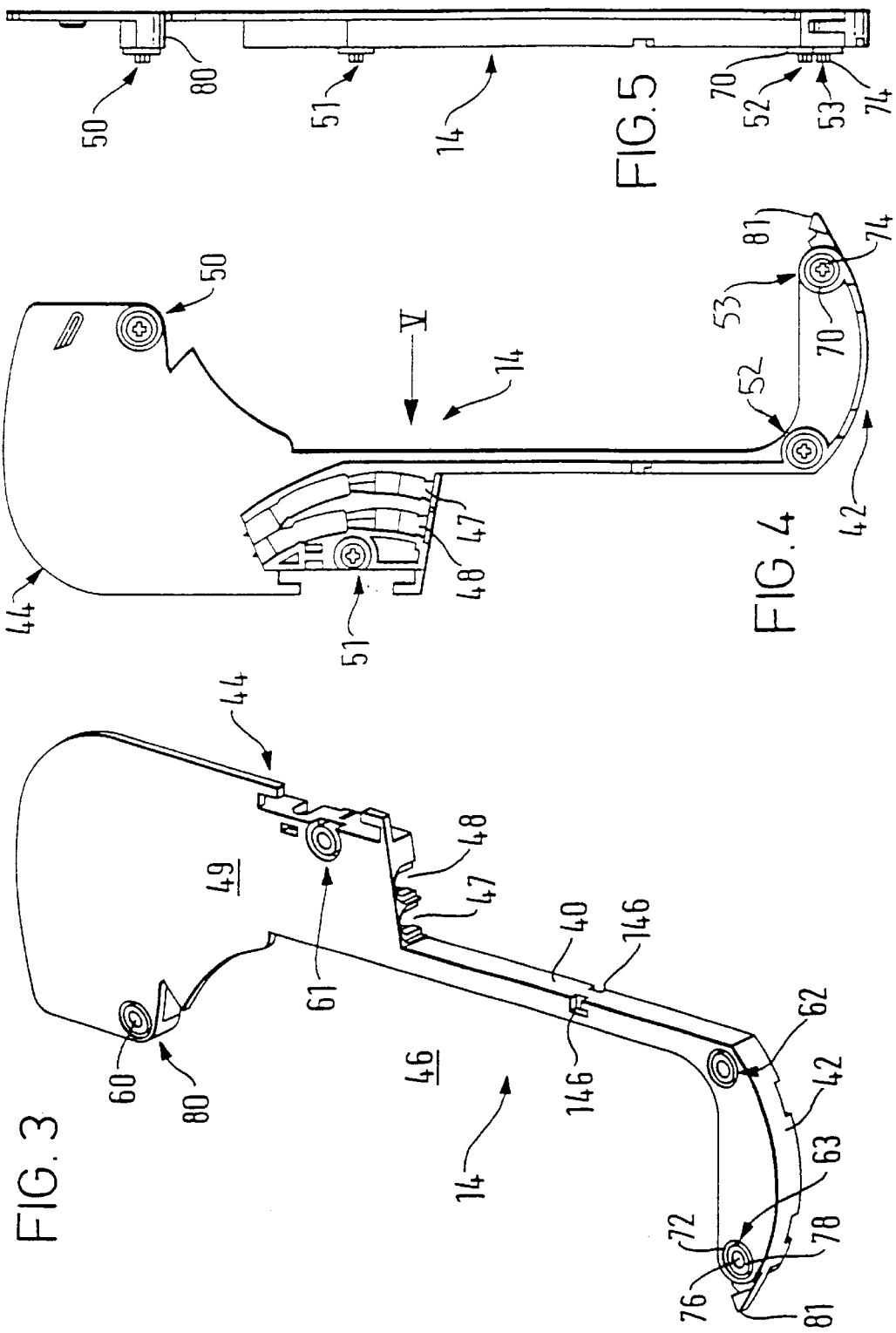

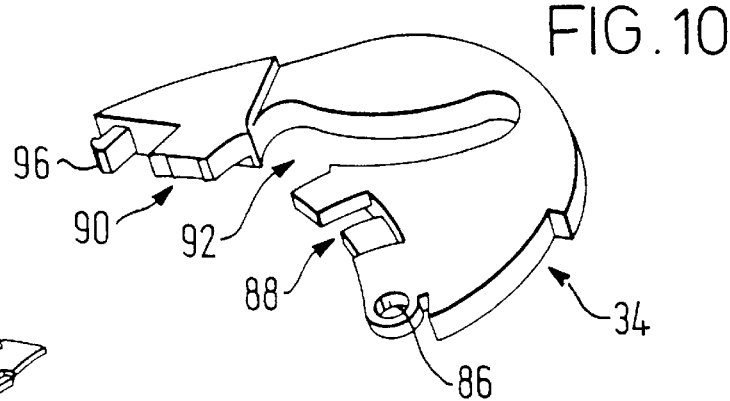
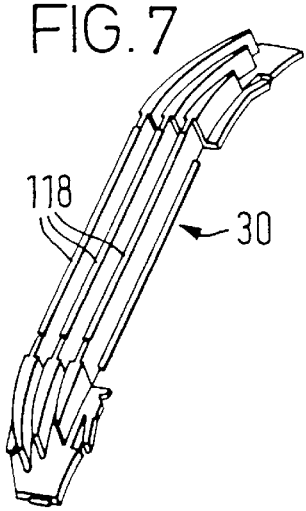
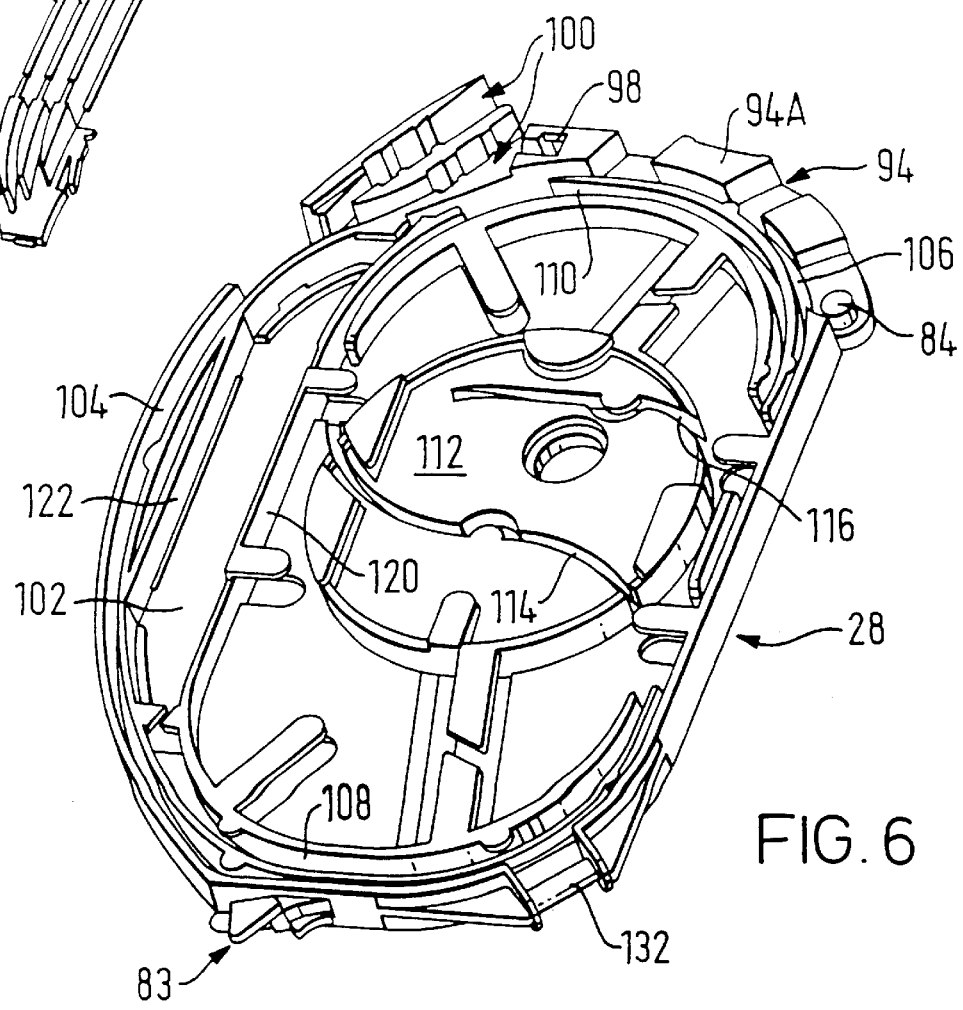

CONNECTING OPTICAL FIBRES

This invention relates to the connection of optical fibres and in particular to a housing for optical fibre connections and an assembly provided with a plurality of such housings for housing associated optical fibre connections.

Such assemblies are known, for example, from U.S. Pat. No. 5,187,766, and EP 0370819A in each of which such housings are disposed in an aligned bank with each housing being movable out of alignment with the other housings to provide access to the optical fibre connection or connections therein.

The assemblies disclosed in the above-mentioned specifications (i) are inefficient in their use of space, which is a disadvantage when the assembly needs to be accommodated in locations where space is limited, and (ii) have a construction which restricts the number of housings they can incorporate, which is a disadvantage when assemblies with different numbers of housings are required.

Our GB 2282457A discloses an assembly which does not have the above-mentioned disadvantages and which comprises a plurality of housings for housing optical fibre connections, each housing being pivotally mounted to a respective rigid routing member having passage means for routing fibres to the housing via a respective flexible conduit means extending between the routing member and the housing, said routing members being rigidly connected one to another such that said housings are arranged in an aligned bank when in stowed positions, each housing being pivotable for providing access thereto from its stowed position out of alignment with the other housings.

It will be appreciated that since each housing is mounted to its associated routing member, the number of housings in the assembly may be varied to suit requirements. Also, since the routing members are connected together such that the housings are arranged in an aligned bank, the space occupied by the housings in an assembly may be minimised for the number of housings in that assembly.

In the assembly disclosed in GB 2282457 the rigid routing members are rigidly connected together by ties which extend through aligned through bores in those members. Thus although any number of housings can be arranged in an assembly, the length of the ties used to connect the members together varies depending on the number of housings in the assembly.

SUMMARY OF THE INVENTION

In one aspect of the invention the need for ties to interconnect the rigid routing members together, and hence the need to provide ties of the appropriate length, is obviated by push-fitting the rigid routing members together. In this aspect the invention provides an assembly for use in connecting optical fibres comprising a plurality of housings for housing optical fibre connections each housing being pivotally mounted with respect to an associated rigid routing member having passage means for routing fibres to the housing via respective flexible conduit means which extend between the routing member and the housing, adjacent routing members being push-fittable together such that the housings are in an aligned bank when in stowed positions, each housing being pivotable for providing access thereto from its stowed position out of alignment with the other housings.

Advantageously each housing may be pivotally mounted about a pivot extending between the rigid routing member associated therewith and a rigid routing member adjacent to that associated rigid routing member.

The above-mentioned pivot may comprise a boss provided on said associated rigid routing member which is push-fittable to said adjacent rigid routing member.

Each housing may have means defining a closed slot for receiving said pivot whereby said housing is able to pivot and slide relative to said rigid routing member associated therewith.

Advantageously, the slot may be openable to enable said housing to be removed from said assembly. In this case, the slot may be defined by adjacent portions of said housing which are moveable relative to each other from a first condition in which said slot is closed to a second condition in which said slot is open. Preferably the adjacent portions may comprise a first portion hinged to a second portion. In this case preferably the second portion of said housing comprises means for locating optical fibre connections and for storing excess lengths of fibre.

The second portion may comprise an insert providing said means for locating optical fibre connections. Advantageously this insert may be one of a plurality of differently configured inserts each of which is selectively fittable to said housing.

The assembly may comprise a further housing for housing at least one optical device having input and output fibre tails, and means for guiding said tails from said further housing to said first-mentioned housings including guide members defining optical fibre tracks push-fitted to said rigid routing members for guiding said tails to selected passage means of said rigid routing members.

In another aspect the invention provides an assembly for use in connecting optical fibres comprising a plurality of housings for housing optical fibre connections, said housings being arranged in an aligned bank with each housing having a slot through which a pivot extends whereby said housing is able to pivot and slide with respect to said pivot to move out of alignment with the other housings for providing access thereto.

In another aspect the invention provides a housing for accommodating optical fibre connections and excess lengths of fibre and comprising means for guiding fibre within the tray to a zone in which said connections are accommodated, said housing having an insert in said zone providing means for locating said optical fibre connections.

The insert may be one of a plurality of differently configured inserts fittable in said zone.

Advantageously, the insert may include apertures adjacent said connection locating means and means for guiding optical fibres over said apertures.

BRIEF DESCRIPTION OF THE DRAWINGS

In order that the invention may be well understood, an embodiment thereof, which is given by way of example only, will now be described with reference to the accompanying drawings, in which:

FIG. 3 is a perspective view from the top of a rigid routing member of the assembly;

FIG. 4 is a view of the rigid routing member from underneath;

FIG. 5 is a side view of the rigid routing member in the direction of arrow V in FIG. 4;

FIG. 6 is a perspective view from the top of a tray of the assembly;

FIG. 7 is a perspective view of an insert for the tray of FIG. 6;

FIG. 10 is a perspective view of an extension portion for the tray;

Figure 1:
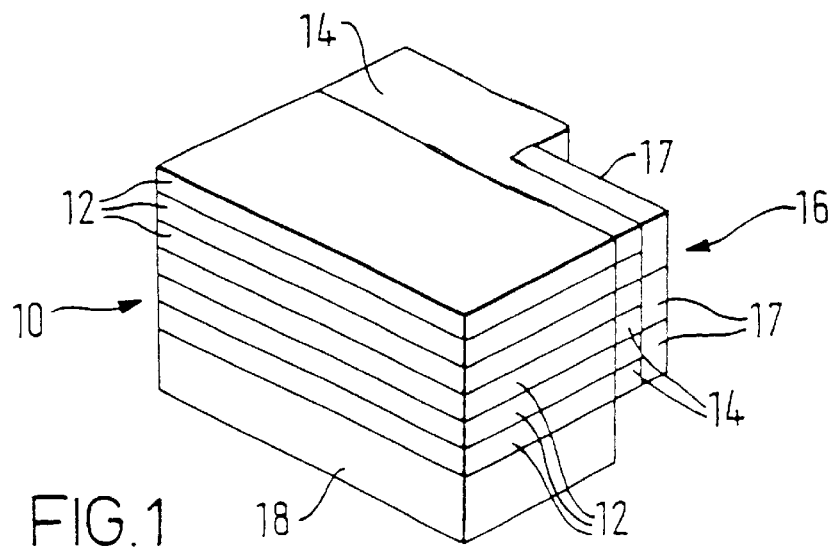
FIG. 1 is a schematic view of an assembly for use in connecting optical fibres to at least one optical device having input and output tails.

Referring first to FIG. 1, the assembly 10 comprises a plurality of housings 12 for housing optical fibre connections. Each housing 12 is pivotally mounted with respect to an associated rigid routing member 14 which is provided with passages for routing fibres to the housing. The routing members are push-fitted together such that the housings are arranged in an aligned bank—in the illustrated example in a stack or tier rather than a row. Each housing is pivotable for providing access thereto from its illustrated stowed position out of alignment with the other housings. The aligned bank of housings 12 are arranged in alignment with a further housing 18 for housing at least one passive optical device. A guide 16 comprising guide members 17 push-fitted to the rigid routing members 14 provides optical fibre tracks between the housing 18 and the rigid routing members.

The assembly enables input and output optical tails of the or each passive optical device (for example, a splitter having a single input tail and four output tails) in housing 18 to be connected to respective optical fibres carrying signals to or away from the optical device and the connections housed in the housings 12—one or more in each housing. Housing the connections separately from the optical device and locating them in a plurality of housings facilities both installation and maintenance.

Figure 2:
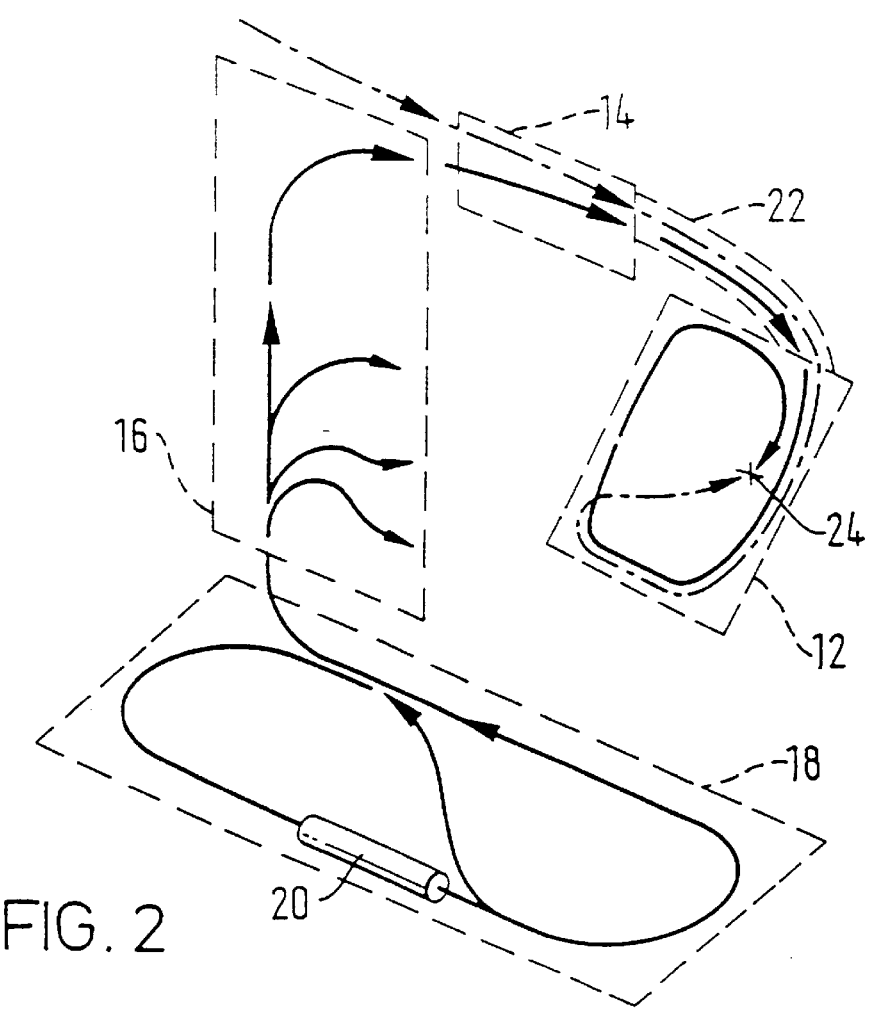
FIG. 2 is a diagram showing fibre routing of the assembly of FIG. 1.

Referring to FIG. 2, the tails of an optical device in housing 18 are routed, as shown in solid line, within that housing, through the guide 16 to the routing members 14. From each routing member 14 (only one indicated in FIG. 2) the tail or tails routed thereto are routed through a flexible conduit means, indicated at 22, to the housing 12 associated with that routing member and within that housing. In FIG. 2, the housing 12 illustrated is shown in a position pivoted from its stowed position adjacent the routing members 14. The chain dotted line in FIG. 2 indicates the route of an optical fibre through the routing member 14, flexible conduit 22 and within the housing 12 for connection to an optical tail at location 24.

The tails of the optical device and the optical fibres to be connected to them are guided within the assembly along predetermined paths such that the tails and fibres are not subjected to bending below a predetermined bend radius.

The assembly may be supplied for installation 'pre-fibred', that is having at least one passive optical device housed in housing 18 with the optical fibre tails thereof routed to the housings 12, as described above, in readiness for connection to optical fibres which are routed to the housings via the routing members and flexible conduits by the installer.

Figure 8:
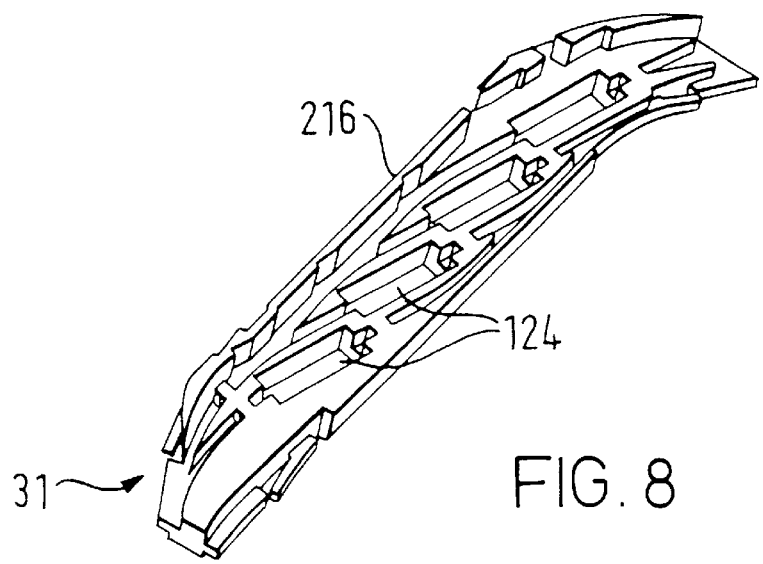
FIG. 8 is a perspective view of an alternative insert for the tray.
Figure 9:
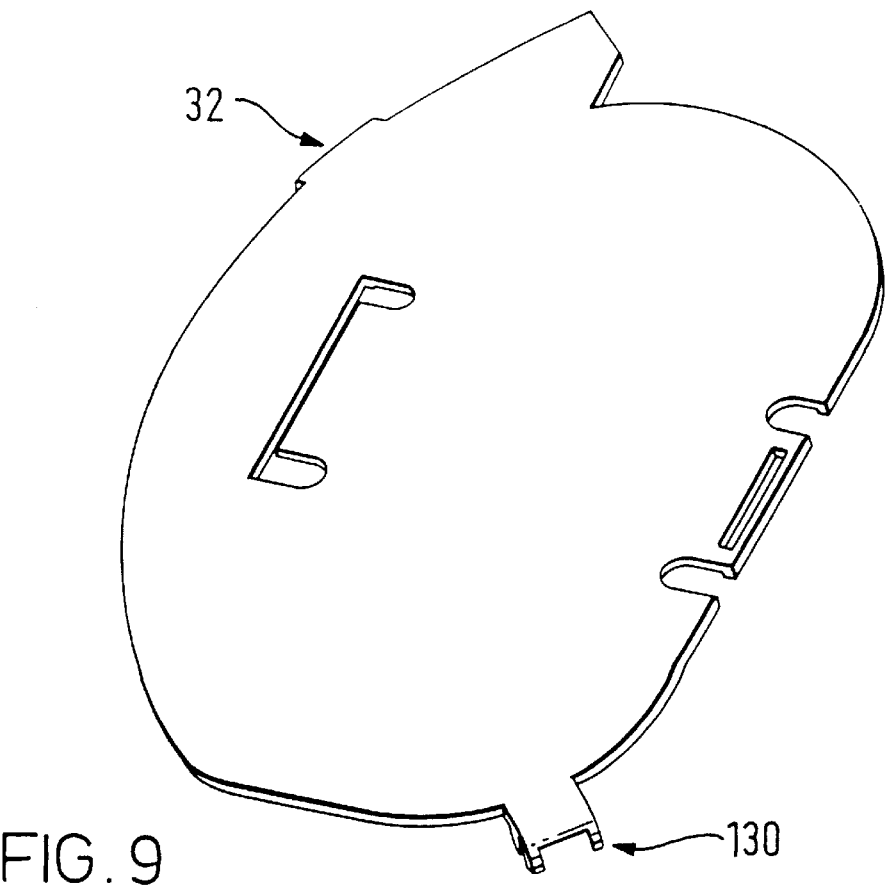
FIG. 9 is a perspective view of a lid for the tray.
Figure 12:
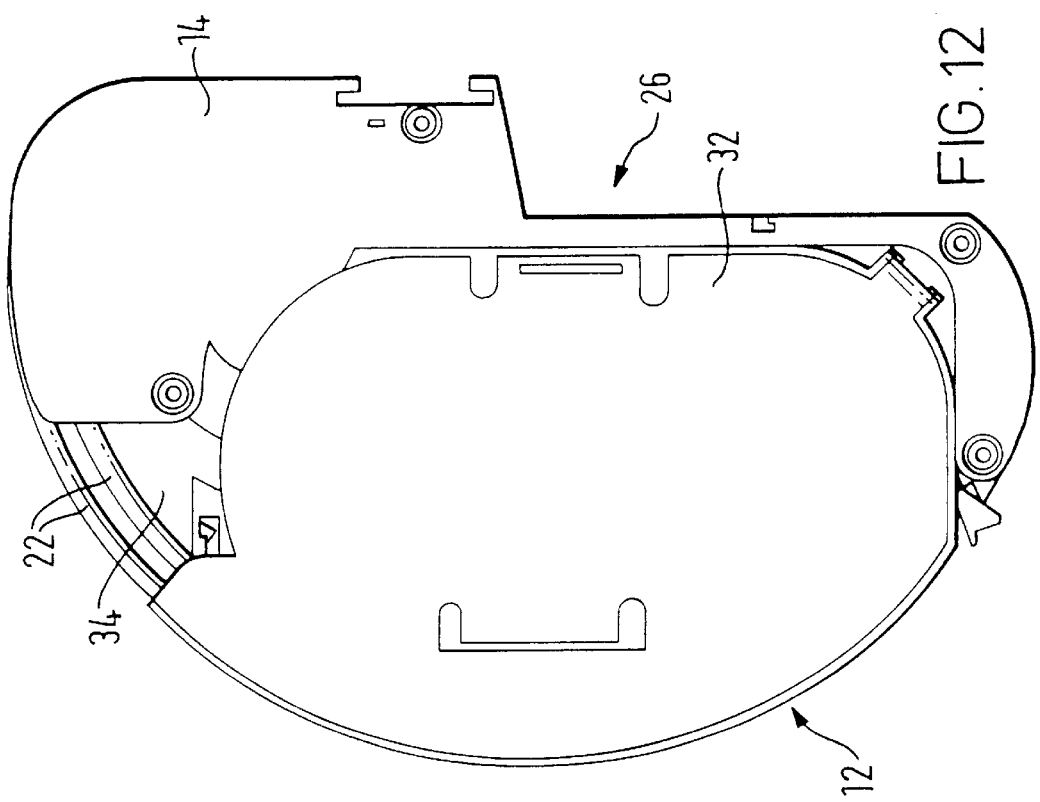
FIG. 12 is a top view of a module comprising a rigid routing member, a tray, a lid and an extension portion, the module being shown in a condition in which the tray is in a stowed position relative to the routing member and the lid is in a closed position relative to the tray.
Figure 13:
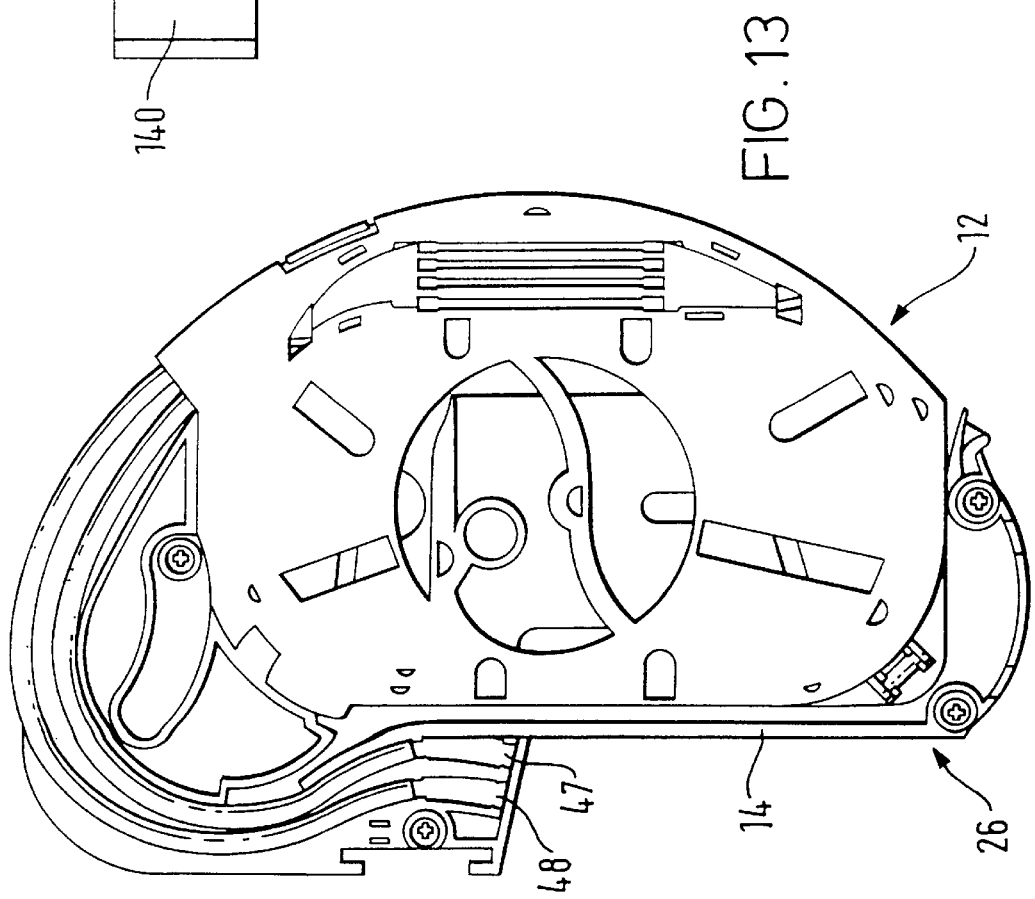
FIG. 13 is a bottom view of the module of FIG. 12 showing the module in the same condition.
Figure 14:
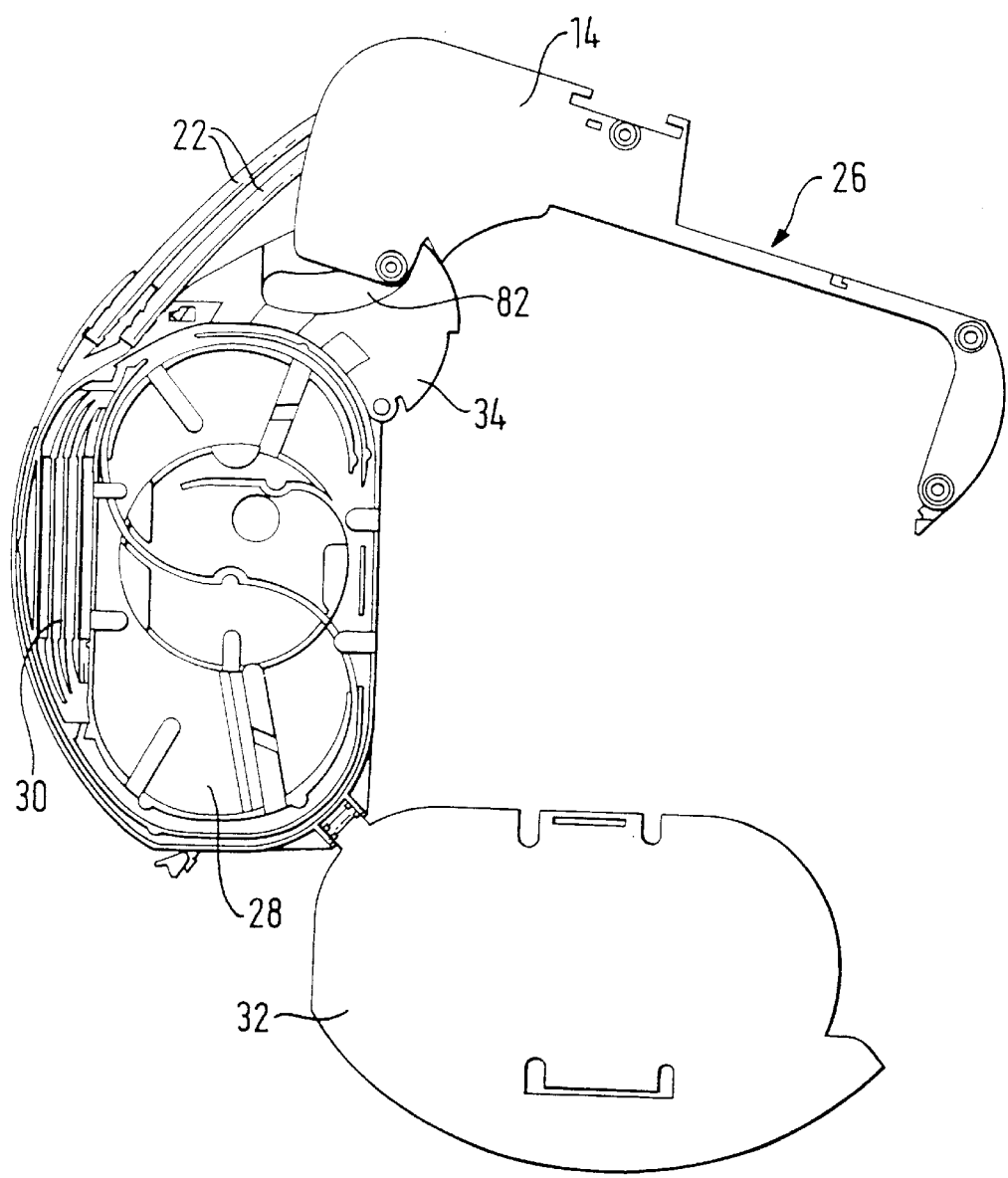
FIG. 14 is a top view of the module of FIG. 12 to a reduced scale showing the module in a condition in which the tray is in an unstowed position relative to the routing member and the lid is in an unstowed position relative to the routing member and the lid is in an open position relative to the tray.

In more detail, the assembly 10 comprises a plurality of modules 26 illustrated in FIGS. 12 to 14, each comprising a rigid routing member 14 (shown by itself in FIGS. 3 to 5), a tray 28 (shown by itself in FIG. 6), a tray insert 30 (shown by itself in FIG. 7), a tray lid 32 (shown by itself in FIG. 9), a tray extension portion 34 (shown by itself in FIG. 10) and two flexible conduits 22. The tray 28 together with its insert 30, lid 32 and extension portion 34 form a housing 12 of the assembly 10. An alternative tray insert 31 is shown in FIG. 8.

The modules 26 are connected to each other by push-fitting the routing members 14 thereof together such that housings 12 are in an aligned bank when in stowed positions relative to the routing members 14 (as shown in FIGS. 12 and 13).

Each housing 12 is pivotable out of alignment with the other housings 12 in the assembly 10 for providing access thereto as indicated in FIG. 14.

The sub-assembly of modules 26 push-fitted together via their routing members is fitted to the further housing 18 with the housings 12 of the modules in alignment with the housing 18 which has substantially the same plan profile, or "foot print", as the housings 12.

Figure 15:
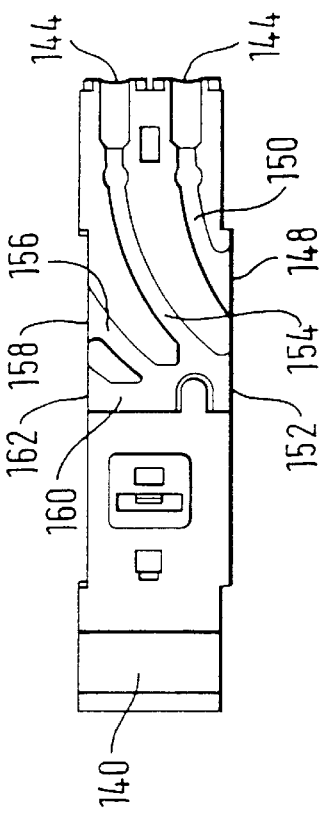
FIG. 15 is a perspective view of a guide member for use with sub-assemblies of modules.

As stated previously guide members 17 (one of which is shown in FIG. 15) push-fitted to the routing members 14 provide predetermined paths for guiding optical fibre tails from the further housing 18 to the routing members.

It will be understood that the assembly 10 may comprise any number of modules 26 and that modules may be added simply by push-fitting the routing members of extra modules to the routing members of existing modules. In this way the assembly may have a range of heights. However, as will be appreciated, the assembly 10 has an elongate configuration of substantially constant cross-section substantially throughout its length regardless of the number of modules.

It is also to be understood that the further housing 18 may be located above rather than below the housings 12 or amongst them and that more than one housing 18 may be provided in the assembly.

It is also understood that the further housing may be omitted and an assembly provided comprising a plurality of modules 26 push-fitted together via their routing members 14. Such an assembly can be used for making point-to-point connections with optical fibres to be connected being routed to a tray 28 of a housing 12 via one or more passages of the associated routing member 14, one or more connections between the fibres and excess fibre being located within the tray.

Referring now to FIGS. 3 to 5, each rigid routing member 14 is a plastics moulding and has an elongate portion 40 extending between end portions 42 and 44 which define a recess 46 which accommodates a substantial portion of the tray 28 associated with the routing member when the housing 12 is in a stowed position.

Grooves 47, 48 are formed on the underside of each routing member and form passage means for routing fibres to the tray of the housing associated with the routing member via respective flexible conduits which are inserted in the grooves 47, 48 as best illustrated in FIG. 13.

The routing member has a substantially flat upper surface 49 throughout its extent and is provided with four projecting formations 50, 51, 52 and 53 projecting downwardly relative to the upper surface 49 and push-fittable into respective recess formations 60, 61, 62 and 63 in the upper surface of a lower adjacent routing member.

As illustrated and as referenced for projecting formation 53 and recess formation 63 each projecting formation has an annular projecting portion 70 fittable into an annular recess 72 of the recess formation and a cruciform projection 74 fittable into a circular recess 76 of the recess formation. An annular portion 78 between the annular and circular recesses 72 and 76 fits between the annular portion 70 and cruciform projection 74. Manufacturing tolerances are such that two rigid routing members are retained together by the push-fits of the projecting formations and recess formations during normal use as part of an assembly, but may be separated one from another if so required without undue force. In this respect the fit may be described as being an interference push-fit. If, however, a more permanent interconnection between the rigid routing members is required a snap-push fit between projecting and recess formations may be provided.

The projecting formation 50 of each routing member 14 also includes a boss 80 (see FIG. 5) on which the annular portion 70 of that formation 50 is provided and this boss 80 forms a pivot about which the housing 12 associated with that routing member can pivot to and from its stowed position. The boss 80 extends between the routing member on which it is provided and the adjacent routing member below it and into the recess formation 60 in which the projecting member 50 is fitted. The boss 80 is received in a closed slot 82 in the housing 12 defined by the tray 28 and tray extension portion 34 of the housing whereby the housing is able to pivot and slide relative to the boss 80 formed on the routing member 14. In this way, as illustrated in FIG. 14, complete access to the tray is achieved on a rotation of the housing about the pivot formed by the boss 80 in the region of 90°. This feature allows like assemblies 10 to be located next to each other with closer spacing than would be the case if the housing needed to pivot approximately 180° to provide complete access to the tray.

The routing member 14 is provided with a hook 81 snap-fittably engageable with a formation 83 (see FIG. 6) on the tray for releasably retaining the tray 28 in a stowed condition of the housing 12.

The tray extension portion 34 is hinged to the tray 28 (which constitutes another portion of the housing) by means of cylindrical boss 84 on the tray received in a cylindrical hole 86 in the extension portion 34. The extension portion and tray are movable relative to each other by pivotal movement about the axis of the boss 84 from a first condition in which the slot 82 is closed (as best shown in FIG. 13) to a second condition in which the slot is open. In the closed condition teeth portions 88 and 90 provided on each side of an open slot 92 in the extension portion 34 interengage with teeth portions 94 on the tray one of which portions 94A closes the opening of the slot 92 formed in the extension portion such that the tray and extension portion together define the closed slot 82. A hook 96 on the extension portion snap-fits in a recess 98 on the tray to secure the extension portion and tray in their first condition. However, it is to be understood that the snap-fit of the hook 96 and recess 98 is such that the hook may be disengaged from the recess (preferably with the aid of a tool) to allow the extension portion to be pivoted about boss 84 in order to open the slot. With the slot open, the housing can be removed from an assembly comprising a plurality of modules 26 by movement transverse the axis of the pivot formed by the boss 80. In this way any housing is easily removable from such an assembly without the need to disassemble the assembly. Also, of course, this feature enables an existing housing in such an assembly to be replaced with another housing having a different internal tray configuration.

Figure 11:
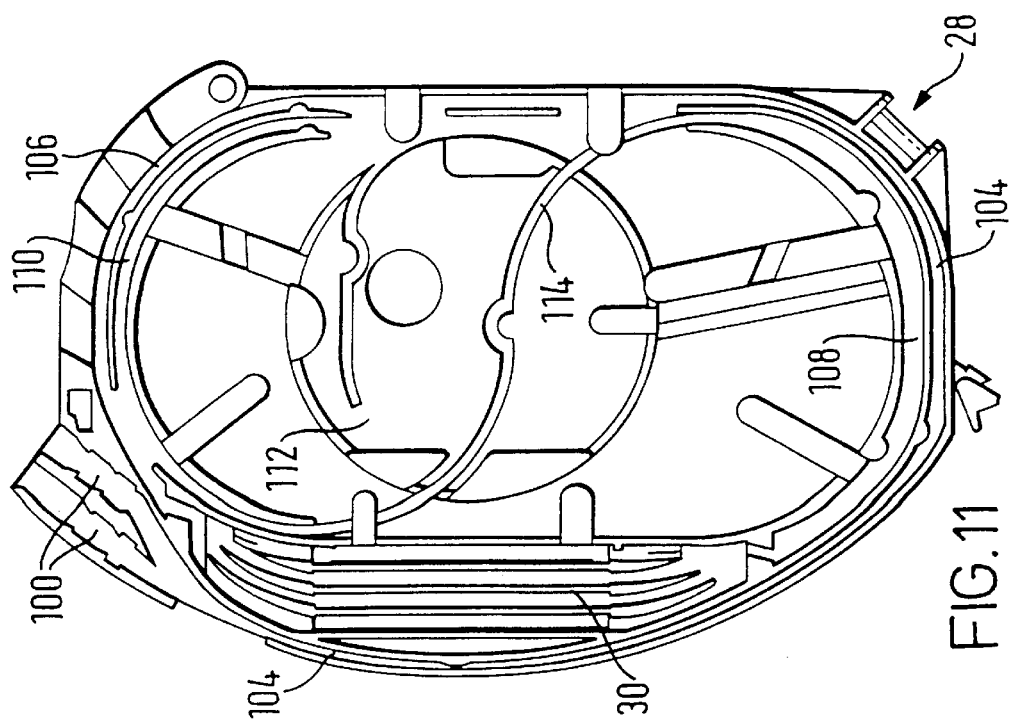
FIG. 11 is a top view of the tray of FIG. 6 fitted with the insert of FIG. 7.

Referring now to FIG. 6 and also FIG. 11, the internal configuration of the tray 28 of the embodiment is shown. The function of the tray is to locate optical fibre connections and store excess lengths of fibre and spare lengths of fibre. To this end the tray configuration defines inlet ports 100 for receiving the conduits 22 and optical fibre guide means for guiding fibres from the conduits within the tray to a zone 102 in which connections between the fibres are to be located. The fibre guide means include an outer peripheral track 104 from the inlet ports extending around the front of the tray and the side thereof remote from the inlet ports 100; an outer peripheral track 106 extending along the side of the tray adjacent the inlet ports 100; inner peripheral tracks 108 and 110 adjacent the two sides of the tray; and a mandrel 112 disposed substantially centrally in the tray and having track 114 extending through it.

As will be understood optical fibres are guided along these tracks and about the mandrel so that bends therein are not more than the minimum bend radius for the fibre. Using the above-mentioned tracks two fibres entering the tray through inlets 100 can be guided so that they enter the zone 102 from different directions for connection end-to-end, for example by splicing and so that the connections can be located in the zone. In this regard it will be understood that a fibre having a path along track 104 can either continue in the same sense (counter-clockwise in FIGS. 6 and 11) by passing into track 106 or can be made to change sense by being fed through track 114 and fed into track 110 and then track 108. It will be noted that track 106 feeds into zone 102 from one direction and track 108 feeds into zone 102 from the other direction.

Before fibre from track 104 is fed to track 106 it may be routed around mandrel 112 in order to store excess fibre. Likewise before fibre is fed from track 110 to track 108 it may be routed around mandrel 112. Further storage is provided on top of mandrel 112 for spare fibre (i.e. fibre which is not presently to be connected to the other fibre). This spare fibre is routed to the top of the mandrel via a ramp track 116 after passage along track 104.

Spaced apart retention guides are provided above the various tracks and storage spaces to retain the fibres in those tracks and spaces.

Insert 30 shown in FIG. 7 (or another insert such as insert 31 shown in FIG. 8) is push-fitted in zone 102. The three parallel walls 118 of insert 30 together with adjacent parallel walls 120 and 122 of the tray define four parallel locations at which optical fibre connections can be located. Each fibre connection is located between and held by an adjacent pair of walls 118, 120 or 122.

Differently configured inserts may be fitted to the tray 28 in the zone 102 and FIG. 8 shows one alternative insert 31 which provides test apertures 124 and, through its wall 216 cooperating with wall 122 of the tray, optical fibre connection locations.

As will be appreciated the use of differently configured inserts in zone 102 enables housings 12 for different functions to be provided using the same tray 28 and avoids the need to provide a different tray for each function.

A lid 32 for the tray is attachable to the tray by a bracket 130, which is snap-fittable to a pivot bar 132 provided on the tray, such that the lid can be pivoted between a closed position in which it covers the tray (as shown in FIG. 12) and an open condition (as shown in FIG. 13). The lid is illustrated as opaque but may be transparent to enable the interior of the tray to be inspected without opening the lid.

FIG. 15 shows a guide member 17 for use with two adjacent routing members 14. The guide member comprises an elongate element 140 which is provided at one end 142 with two spigots 144 locatable in the passages 47 of two adjacent routing members of a sub-assembly of modules 26. The element 140 is provided with grooves on one side which provide tracks for fibres and in particular fibre tails from a passive optical device located in further housing 18. On the opposite side about midway along the length of the element there is a projection which snap-fits in a hole defined by cooperating recesses 146 (see FIG. 3) of two adjacent routing members of the sub-assembly. The grooves provide tracks which enable fibres to be directed from the next lower guide member 17 to the next upper guide member 17 or to the passages 47 of the routing members. More specifically: a fibre entering a bottom opening 148 is directed along track 150 to the passage 47 of the lower of the two routing members to which the guide member 17 is fitted; a fibre entering a bottom opening 152 may be directed (i) along track 154 to the passage 47 of the upper of these two routing members, (ii) along track 156 to an upper opening 158 which aligns with bottom opening 148 of the next upper guide member for direction along track 150 of that guide member, or (iii) along track 160 to an upper opening 162 which aligns with bottom opening 152 of the next upper guide member for direction along tracks 154, 156 or 160 of that guide member.

Thus it will be seen that the use of guide members enables fibre tails from the further housing of the assembly 10 to be selectively guided to the passages 47 of the routing members of the assembly and thence into the trays via the conduits 22 connected to the passages 47. Optical fibres to be connected to the tails are fed into the desired trays through passages 48 and the conduits 22 connected thereto. A respective cover (not shown) snap-fittable to each elongate element 140 covers the grooves and prevents access to the fibres in the grooves.

The further housing 18 of the assembly is not illustrated in detail. It takes the form of a tray within which there is provided means for locating at least one passive optical device and for routing the optical fibre tails thereof to the bottom openings 148, 152 of the lowermost guide member 17 in the assembly. The tray is provided with a cover which is not readily removable in order to prevent unauthorised access to its contents.

As stated previously, the further housing 18 will be omitted from the assembly when the assembly is required for point-to-point fibre connections only. In this case the guide members 17 will not be fitted to the routing members and the fibres to be connected in each tray will be directed thereto through passages 47 and 48 of the routing members.

It will also be appreciated that the assembly 10 may be modified by the omission of, say, the uppermost guide member 17 whereby the upper two housings 12 can be used for point-to-point connections and the lower four housings 12 can be used for connections to the tails of the or each passive optical device housed in housing 18.

It is to be understood that the fibres fed to each tray may be single fibres or ribbon fibre. In the latter case for example two ribbon fibres with say twelve fibres each may be connected in a tray as illustrated in FIG. 11 since location for twelve connections is provided using the insert 30. Also since the tray has uniform depth throughout except for the location of the mandrel the ribbon fibre may be run unseparated in the tray tracks and the height of the tray is preferably selected to accommodate a twelve fibre ribbon fibre.

All of the parts of the modules 26 and the guide members 17 are formed in plastics and have sufficient resilience to allow the push-fits referred to above. It will be appreciated that (i) each module 26 is easily assembled by push-fitting the parts together, (ii) those modules 26 are easily assembled together by push-fitting the rigid routing members 14 of the modules together, and (iii) the guide members 17 are easily assembled to the routing members 14 by push-fitting.

It will also be appreciated that the push-fits used may be interference fits or, if a more permanent coupling is required, snap-fits.

What is claimed is:

1. An assembly for use in connecting optical fibres comprising a plurality of housings for housing optical fibre connections each housing being pivotally mounted with respect to an associated rigid routing member having passage means for routing fibres to the housing via respective flexible conduit means which extend between the routing member and the housing, adjacent routing members being push-fittable together such that the housings are in an aligned bank when in stowed positions, each housing being pivotable for providing access thereto from its stowed position out of alignment with the other housings.

2. An assembly as claimed in claim 1, wherein each housing is pivotally mounted about a pivot extending between the rigid routing member associated therewith and a rigid routing member adjacent to that associated rigid routing member.

3. An assembly as claimed in claim 2, wherein said pivot comprises a boss provided on said associated rigid routing member which is push-fittable to said adjacent rigid routing member.

4. An assembly as claimed in claim 2 or 3, wherein each housing has means defining a closed slot for receiving said pivot whereby said housing is able to pivot and slide relative to said rigid routing member associated therewith.

5. An assembly as claimed in claim 4, wherein said slot is openable to enable said housing to be removed from said assembly.

6. An assembly as claimed in claim 5, wherein said slot is defined by adjacent portions of said housing which are moveable relative to each other from a first condition in which said slot is closed to a second condition in which said slot is open.

7. An assembly as claimed in claim 6, wherein said adjacent portions comprise a first portion hinged to a second portion.

8. An assembly as claimed in claim 7, wherein said second portion of said housing comprises means f or locating optical fibre connections and for storing excess lengths of fibre.

9. An assembly as claimed in claim 8, wherein said second portion comprises an insert providing said means for locating optical fibre connections.

10. An assembly as claimed in claim 9, wherein said insert is one of a plurality of differently configured inserts each of which is selectively fittable to said housing.

11. An assembly as claimed in claim 1, comprising a further housing for housing at least one optical device having input and output tails, and means for guiding said tails from said further housing to said first-mentioned housings including guide members defining optical fibre tracks push-fitted to said rigid routing members for guiding said tails to selected passage means of said rigid routing members.

12. An assembly for use in connecting optical fibres comprising a plurality of housings for housing optical fibre connections and a plurality of routers push-fittable together, said housings being arranged in an aligned bank with each housing being pivotably mounted to a corresponding router and being configured to pivot and slide and to move out of alignment with other housings to provide access thereto.

13. The assembly of claim 12, wherein each housing includes a slot through which a pivot extends.

14. An assembly as claimed in claim 13, wherein said slot is openable to enable said housing to be removed from said assembly by movement transverse to said pivot.

* * * * *